United States Patent
Motilal

(10) Patent No.: US 6,264,354 B1
(45) Date of Patent: Jul. 24, 2001

(54) SUPPLEMENTAL AUTOMOTIVE LIGHTING

(76) Inventor: Kamal Motilal, 3996 Teakwood Drive, Mississauga (CA), L5C 3T5

( * ) Notice: Subject to any disclaimer, the term of this patent is extended or adjusted under 35 U.S.C. 154(b) by 0 days.

(21) Appl. No.: 09/621,986

(22) Filed: Jul. 21, 2000

(51) Int. Cl.[7] .................................................. B60Q 1/18
(52) U.S. Cl. ......................... 362/505; 362/523; 362/371
(58) Field of Search .................................. 362/505, 523, 362/549, 371

(56) References Cited

U.S. PATENT DOCUMENTS

| | | |
|---|---|---|
| D. 400,991 | 11/1998 | Larosa et al. . |
| D. 407,168 | 3/1999 | Arakelian . |
| 4,485,430 | 11/1984 | Fustel . |
| 4,955,577 * | 9/1990 | Ching ................................... 362/505 |
| 5,195,816 | 3/1993 | Moss, Jr. et al. . |
| 5,311,411 | 5/1994 | Garolfi . |
| 5,611,510 | 3/1997 | Yamamoto . |
| 5,685,631 | 11/1997 | Dobert et al. . |
| 5,727,865 | 3/1998 | Caldwell . |
| 5,788,363 | 8/1998 | Kamaya et al. . |
| 6,079,852 * | 6/2000 | Kamaya et al. .................. 362/371 X |

* cited by examiner

Primary Examiner—Stephen Husar

(57) ABSTRACT

A supplemental automotive lighting for increasing the effective illumination of an area in front of a vehicle. The supplemental automotive lighting includes a housing. The housing has a top wall, a bottom wall, and a pair of side walls such that at least one compartment is defined by the walls. Each of the side walls has a pair of arcuate slots therein. Each pair arcuate slots are spaced and lie along an edge of a common circle. A headlight may be placed in the compartment. A bracket means pivotally secures the housing to the bumper. The bracket means comprises a base portion. The base portion is elongate and has a first end and a second end. A pair of leg portions is integral to and extends in parallel direction away from one of the ends of the base portion such that the bracket means is generally U-shaped. A bore extends through a central portion of the base portion. A fastener may extend through the bore into the bumper of the vehicle. Each of the leg portions has a pair of holes therein. The holes are positioned such that each of the holes are alignable with one of the slots in the side walls. Each of a plurality of fastening means for removably fastening the legs to the side walls extends through one of the holes and a respective slot.

9 Claims, 5 Drawing Sheets

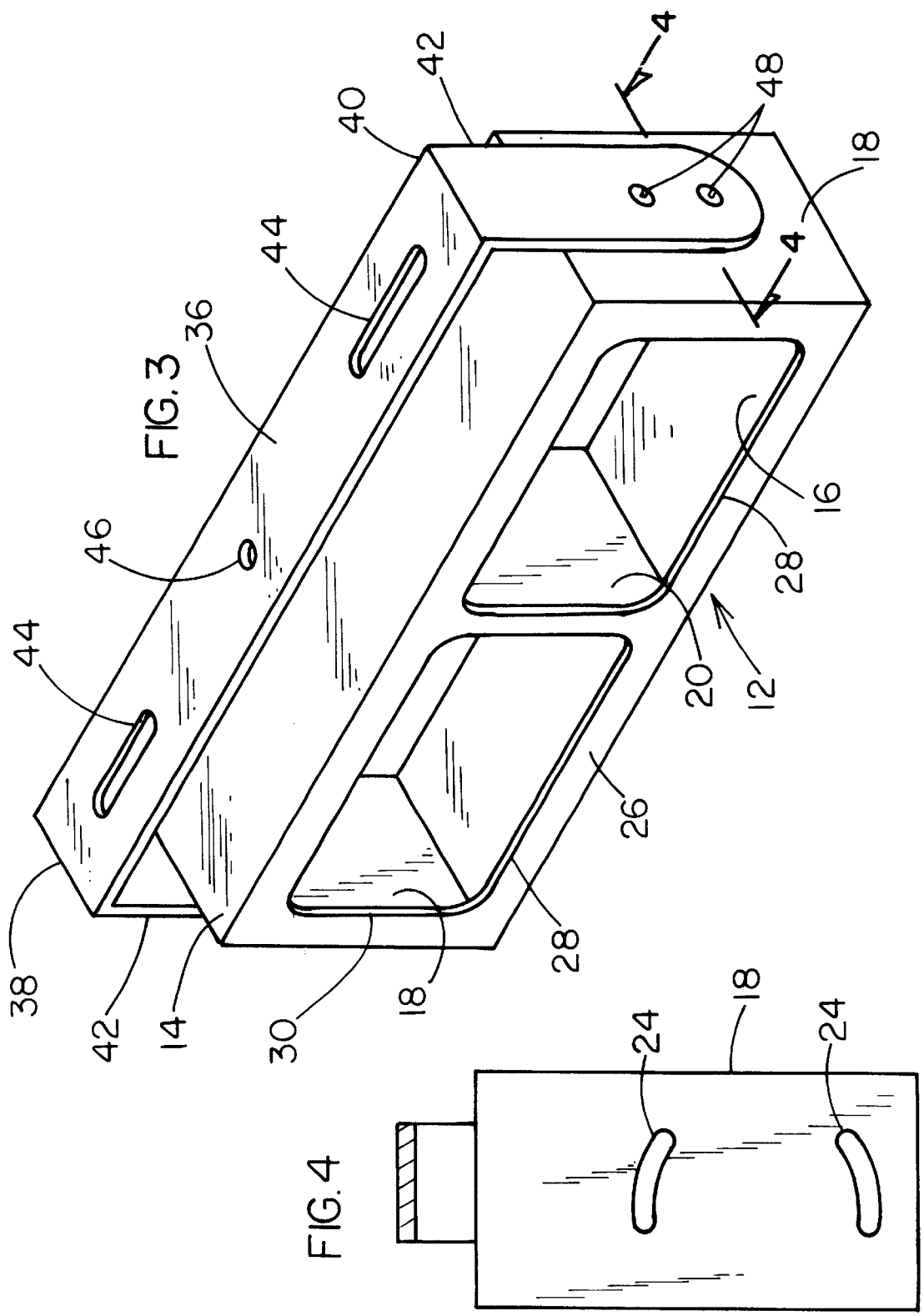

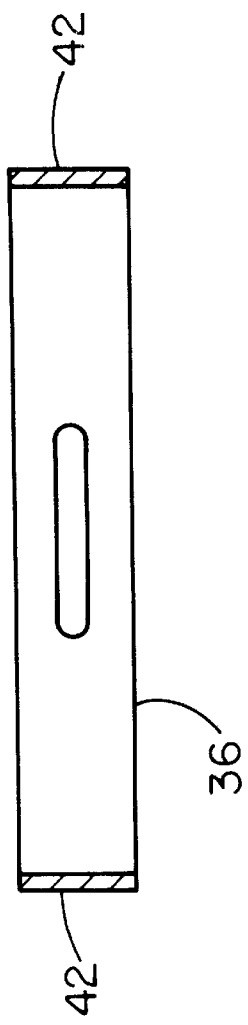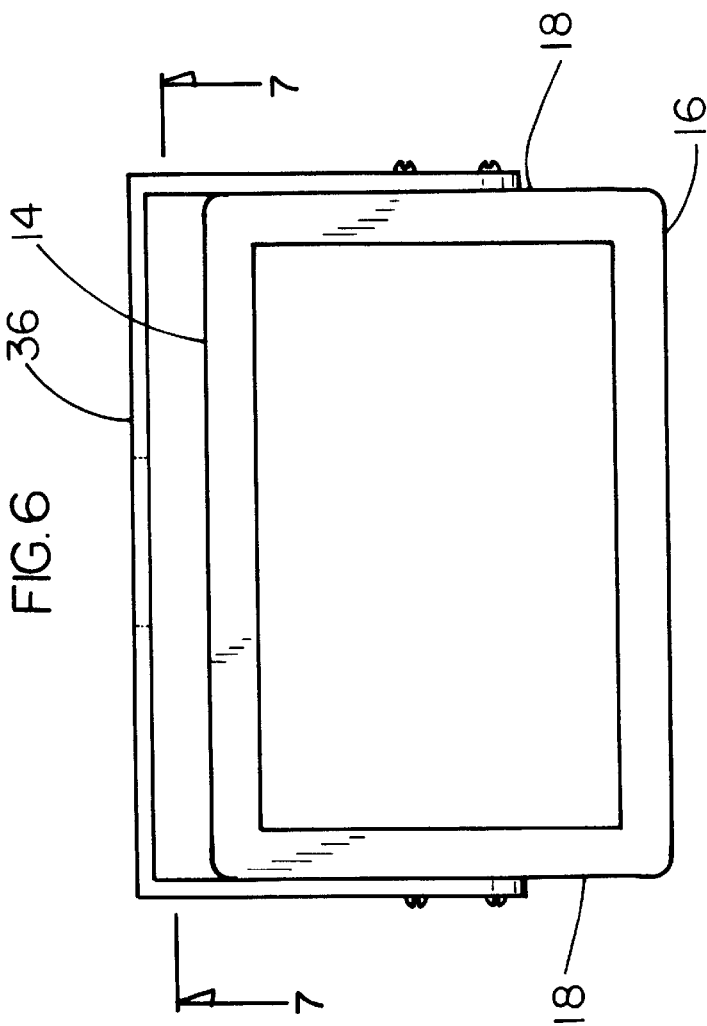

SUPPLEMENTAL AUTOMOTIVE LIGHTING

BACKGROUND OF THE INVENTION

1. Field of the Invention

The present invention relates to automotive lighting and more particularly pertains to a new supplemental automotive lighting for increasing the effective illumination of an area in front of a vehicle.

2. Description of the Prior Art

The use of automotive lighting is known in the prior art. More specifically, automotive lighting heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,195,816; 5,788,363; 5,611,510; 5,311,411; 5,685,631; U.S. Des. Pat. No. 400,991; U.S. Des. Pat. No. 407,168; U.S. Pat. Nos. 5,727,865; 4,485,430; and 6666.

While these devices fulfill their respective, particular objectives and requirements, the aforementioned patents do not disclose a new supplemental automotive lighting. The inventive device includes a housing. The housing has a top wall, a bottom wall, and a pair of side walls such that at least one compartment is defined by the walls. Each of the side walls has a pair of arcuate slots therein. Each pair arcuate slots are spaced and lie along an edge of a common circle. A headlight may be placed in the compartment. A bracket means pivotally secures the housing to the bumper. The bracket means comprises a base portion. The base portion is elongate and has a first end and a second end. A pair of leg portions is integral to and extends in parallel direction away from one of the ends of the base portion such that the bracket means is generally U-shaped. A bore extends through a central portion of the base portion. A fastener may extend through the bore into the bumper of the vehicle. Each of the leg portions has a pair of holes therein. The holes are positioned such that each of the holes are alignable with one of the slots in the side walls. Each of a plurality of fastening means for removably fastening the legs to the side walls extends through one of the holes and a respective slot.

In these respects, the supplemental automotive lighting according to the present invention substantially departs from the conventional concepts and designs of the prior art, and in so doing provides an apparatus primarily developed for the purpose of increasing the effective illumination of an area in front of a vehicle.

SUMMARY OF THE INVENTION

In view of the foregoing disadvantages inherent in the known types of automotive lighting now present in the prior art, the present invention provides a new supplemental automotive lighting construction wherein the same can be utilized for increasing the effective illumination of an area in front of a vehicle.

The general purpose of the present invention, which will be described subsequently in greater detail, is to provide a new supplemental automotive lighting apparatus and method which has many of the advantages of the automotive lighting mentioned heretofore and many novel features that result in a new supplemental automotive lighting which is not anticipated, rendered obvious, suggested, or even implied by any of the prior art automotive lighting, either alone or in any combination thereof.

To attain this, the present invention generally comprises a housing. The housing has a top wall, a bottom wall, and a pair of side walls such that at least one compartment is defined by the walls. Each of the side walls has a pair of arcuate slots therein. Each pair arcuate slots are spaced and lie along an edge of a common circle. A headlight may be placed in the compartment. A bracket means pivotally secures the housing to the bumper. The bracket means comprises a base portion. The base portion is elongate and has a first end and a second end. A pair of leg portions is integral to and extends in parallel direction away from one of the ends of the base portion such that the bracket means is generally U-shaped. A bore extends through a central portion of the base portion. A fastener may extend through the bore into the bumper of the vehicle. Each of the leg portions has a pair of holes therein. The holes are positioned such that each of the holes are alignable with one of the slots in the side walls. Each of a plurality of fastening means for removably fastening the legs to the side walls extends through one of the holes and a respective slot.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new supplemental automotive lighting apparatus and method which has many of the advantages of the automotive lighting mentioned heretofore and many novel features that result in a new supplemental automotive lighting which is not anticipated, rendered obvious, suggested, or even implied by any of the prior art automotive lighting, either alone or in any combination thereof.

It is another object of the present invention to provide a new supplemental automotive lighting which may be easily and efficiently manufactured and marketed.

It is a further object of the present invention to provide a new supplemental automotive lighting which is of a durable and reliable construction.

An even further object of the present invention is to provide a new supplemental automotive lighting which is susceptible of a low cost of manufacture with regard to both materials and labor, and which accordingly is then susceptible of low prices of sale to the consuming public, thereby making such supplemental automotive lighting economically available to the buying public.

Still yet another object of the present invention is to provide a new supplemental automotive lighting which provides in the apparatuses and methods of the prior art some of the advantages thereof, while simultaneously overcoming some of the disadvantages normally associated therewith.

Still another object of the present invention is to provide a new supplemental automotive lighting for increasing the effective illumination of an area in front of a vehicle.

Yet another object of the present invention is to provide a new supplemental automotive lighting which includes a housing. The housing has a top wall, a bottom wall, and a pair of side walls such that at least one compartment is defined by the walls. Each of the side walls has a pair of arcuate slots therein. Each pair arcuate slots are spaced and lie along an edge of a common circle. A headlight may be placed in the compartment. A bracket means pivotally secures the housing to the bumper. The bracket means comprises a base portion. The base portion is elongate and has a first end and a second end. A pair of leg portions is integral to and extends in parallel direction away from one of the ends of the base portion such that the bracket means is generally U-shaped. A bore extends through a central portion of the base portion. A fastener may extend through the bore into the bumper of the vehicle. Each of the leg portions has a pair of holes therein. The holes are positioned such that each of the holes are alignable with one of the slots in the side walls. Each of a plurality of fastening means for removably fastening the legs to the side walls extends through one of the holes and a respective slot.

Still yet another object of the present invention is to provide a new supplemental automotive lighting that may hold either headlights or fog lights depending on need and which are easily angled with respect to the vehicle.

Even still another object of the present invention is to provide a new supplemental automotive lighting that is retrofittable to a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of the present invention.

FIG. 4 is a schematic side view of the present invention.

FIG. 6 is a schematic front view of the present invention having a single compartment.

FIG. 7 is a schematic top view taken along line 7—7 of the present invention having a single compartment.

DESCRIPTION OF THE PREFERRED EMBODIMENT

Figure 1:
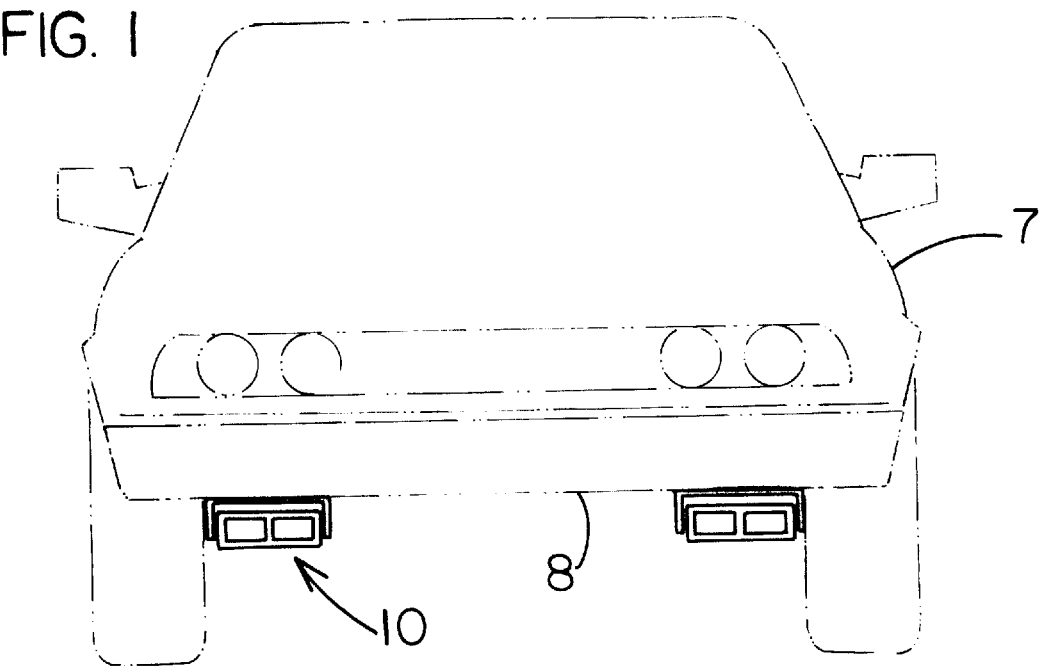
FIG. 1 is a schematic front view of a new supplemental automotive lighting according to the present invention.
Figure 2:
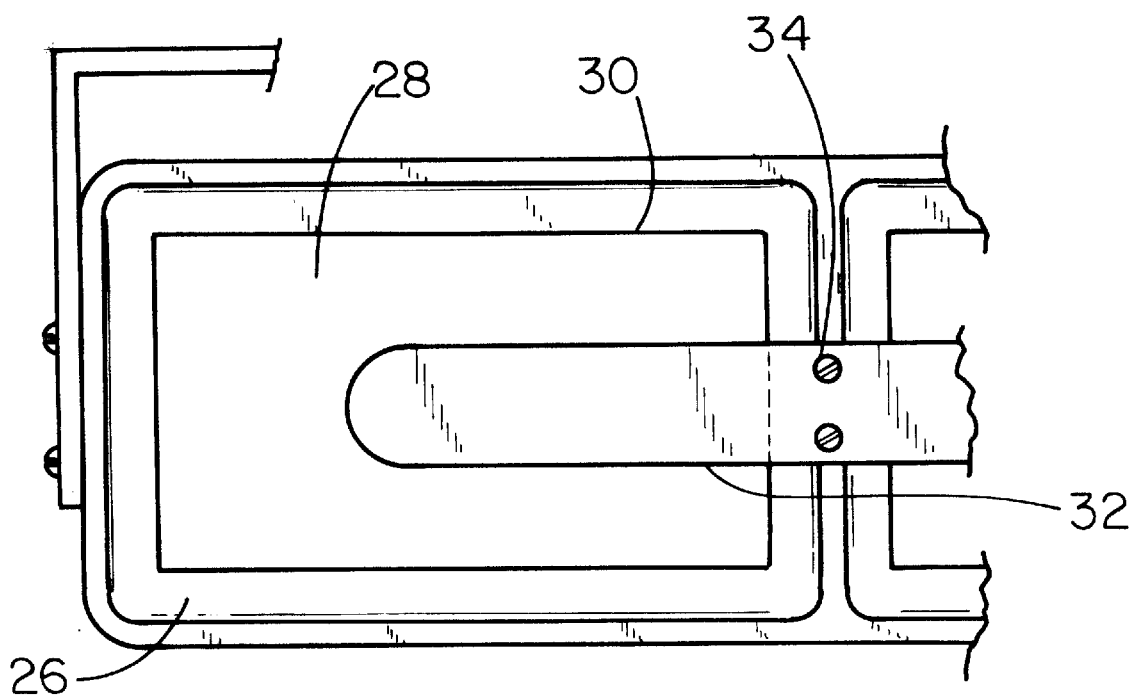
FIG. 2 is a schematic back view of the present invention.
Figure 5:
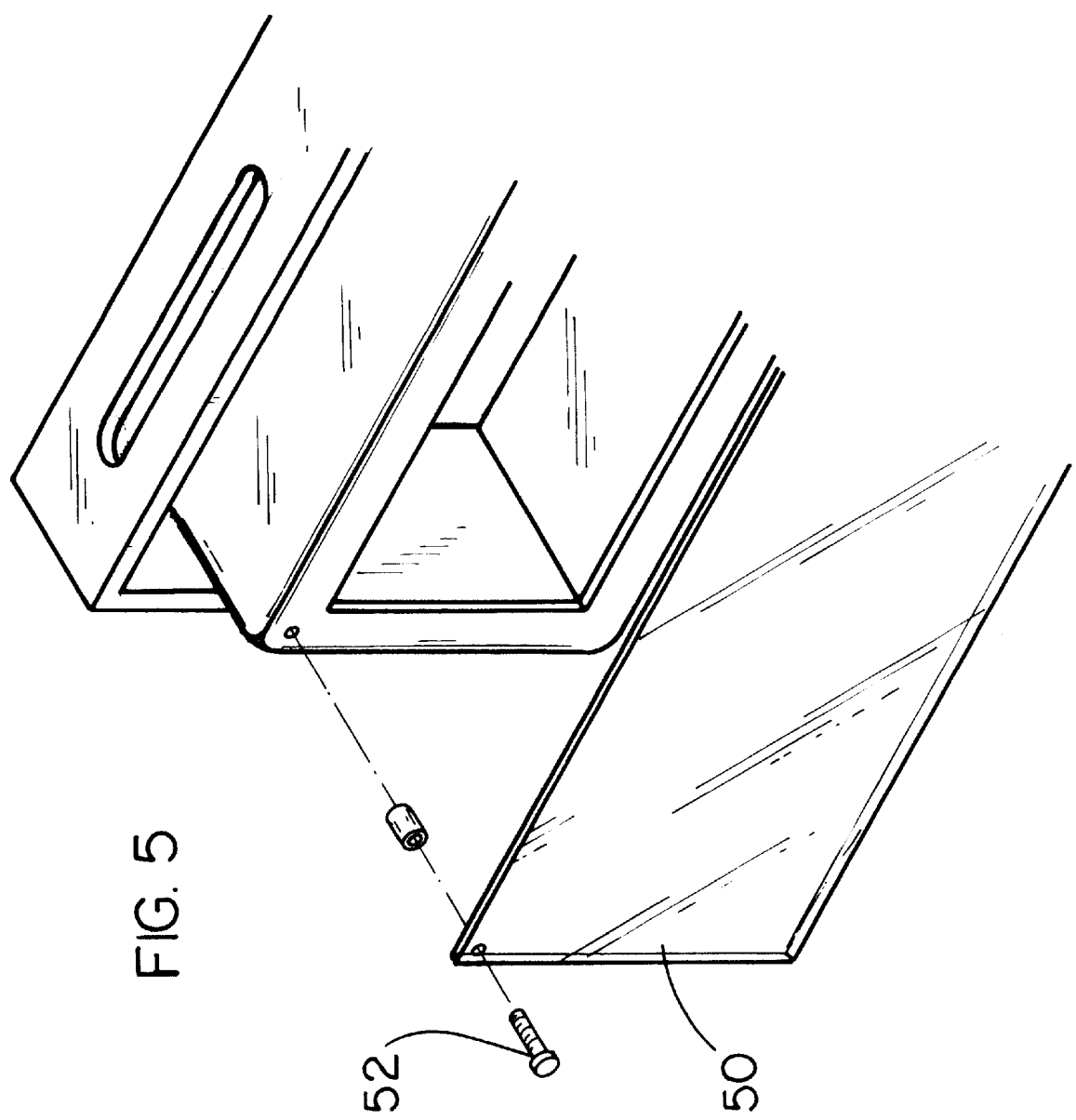
FIG. 5 is a schematic perspective view of the present invention.
Figure 9:
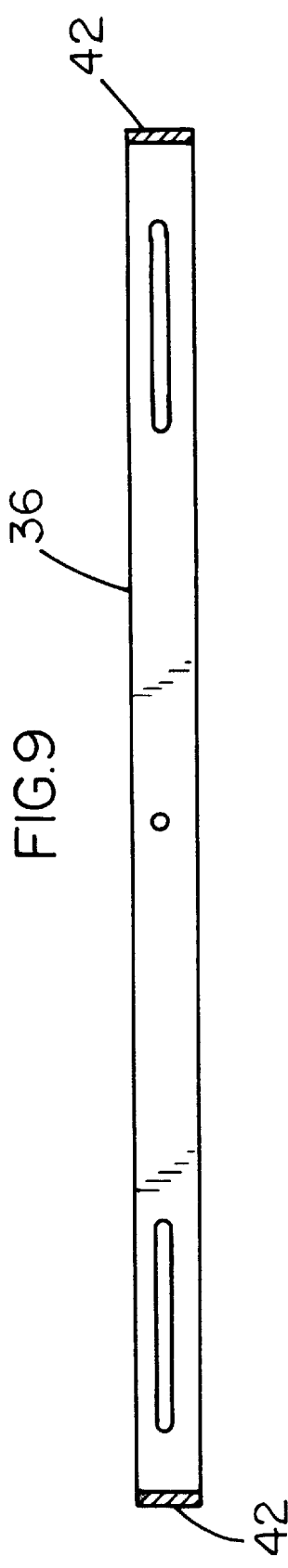
FIG. 9 is a schematic top view taken along line 9—9 of the present invention.

With reference now to the drawings, and in particular to FIGS. 1 through 9 thereof, a new supplemental automotive lighting embodying the principles and concepts of the present invention and generally designated by the reference numeral 10 will be described.

Figure 8:
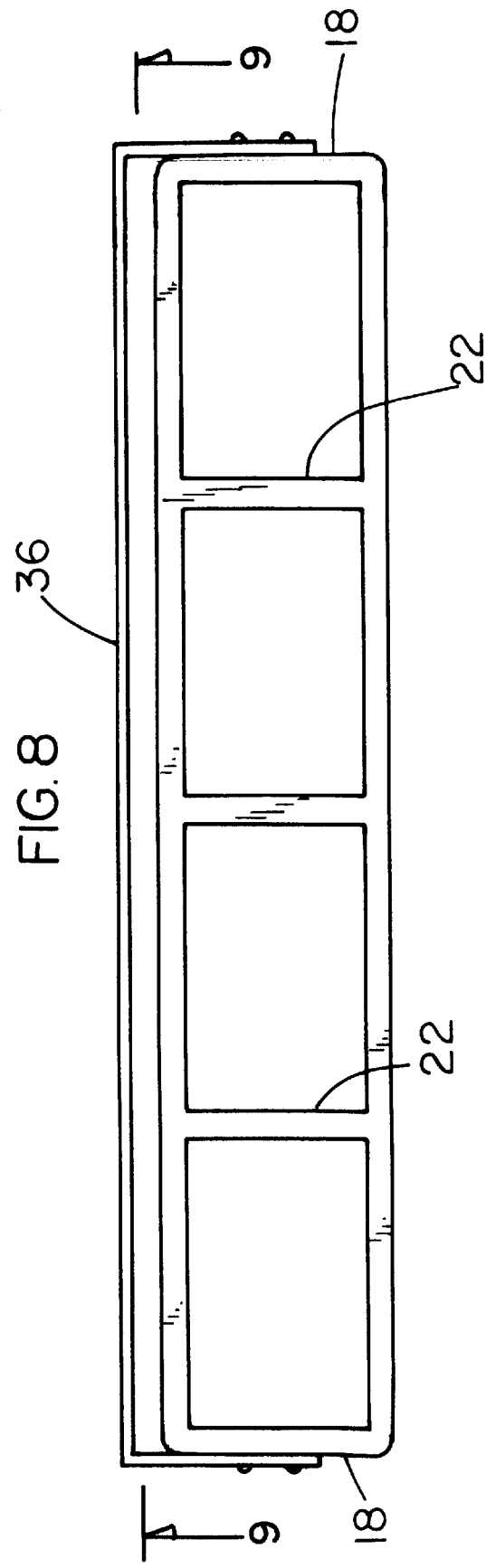
FIG. 8 is a schematic front view of the present invention having a plurality of compartments.

As best illustrated in FIGS. 1 through 9, the supplemental automotive lighting 10 generally comprises a housing 12. The housing 12 has a top wall 14, a bottom wall 16, and a pair of side walls 18. Preferably, a central wall 20 is integral to and extends between the top 14 and bottom 16 walls. The central wall 20 lies in a plane orientated generally perpendicular to planes of the side walls 18. The central wall 20 is generally equally spaced from each of the side walls 18 such that two compartments are defined. Additional inner walls 22, as shown in FIG. 8, may be added such that a plurality of compartments are created. Each of the side walls 18 has a pair of arcuate slots 24 therein. Each pair arcuate slots 24 is spaced and lying along an edge of a common circle traveling along each of said slots. A front wall 26 is integrally coupled to a front edge of the top 14, bottom 16 and side 18 walls. The front wall 26 has two windows 28 therein. Each of the windows 28 is positioned to correspond with an opening formed in the compartments, wherein the windows 28 each define a peripheral edge of a lip 30 extending perpendicularly away from the top 14, bottom 16 and side 18 walls. In the case of multiple compartments, the front wall 26 would have one window 28 for each of the compartments. A headlight may be placed in one of the compartments from a back side of the housing and abutted against the lip 30 formed by the window 28.

A securing means secures the headlight in the opening. The securing means comprises an elongate member 32. A central portion of the elongate member is removably attached to a back side of the central wall 20. The elongate member 32 has a longitudinal axis orientated generally perpendicular to the plane of the central wall 20 such that the elongate member generally transverses the back sides of the compartments. A pair of screws 34 removably fastens the elongate member 32 to the central wall 20.

A bracket means pivotally secures the housing to the bumper. The bracket means comprises a base portion 36. The base portion 36 is elongate and has a first end 38 and a second end 40. A pair of leg portions 42 is integral to and extends in parallel direction away from one of the ends 38, 40 of the base portion 36 such that the bracket means is generally U-shaped. The base portion 36 has a pair of channels 44 therethrough. Each of the channels 44 is positioned generally adjacent to one of the ends 38, 40 of the base portion 36. Each of the channels 44 is elongate and is generally co-axial with a longitudinal axis of the base portion 36. A bore 46 extends through a central portion of the base portion 36. Fasteners, not shown, may extend through the bore 46 and the channels 44 and into the bumper 8 of the vehicle 7. Each of the leg portions 42 has a pair of holes, not shown, therein. The holes are positioned such that each of the holes is alignable with one of the slots 24 in the side walls 18. Each of a plurality of fastening means 48 removably fastens the legs 42 to the side walls 18 by extending through one of the holes and a respective slot 24. The housing 12 may be pivoted with respect to the bracket means by slidably moving the fastening means in the slots 24. Each of the fastening means 48 preferably comprises a screw. In the case of a one-compartment housing, only one bore or one channel may be through the base portion 36.

A shielding means 50 protects headlights mounted in the housing. The shielding means 50 comprises a generally translucent, and preferably transparent, covering. The shielding means 50 is removably coupled to the front wall 26 or to the front edge of the top, side and bottom walls. The translucent covering preferably comprises a plastic material though glass may also be used. Screws 52 may be used to hold the shielding means 50 to the housing.

In use, the bracket means is mounted to the bumper 8 of the vehicle 7. The housing 12 is positioned in the bracket and the fastening means 48 tightened when the angle of the housing 12 is selected by the use. The headlights or fog lights are placed in the compartments and the securing means 32 is placed behind them. The lights are then operationally coupled to the lighting system of the vehicle 7.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable supplemental headlight device, said device being removably coupled to a front bumper of a vehicle, said device being adapted for removably holding headlights and fog lights, said device comprising:
    a housing, said housing having a top wall, a bottom wall, and a pair of side walls such that at least one compartment is defined by said walls, each of said side walls having a pair of arcuate slots therein, each pair arcuate slots being spaced and lying along an edge of a common circle, wherein a headlight may be placed in said compartment;
    a bracket means for pivotally securing said housing to the bumper, said bracket means comprising a base portion, said base portion being elongate and having a first end and a second end, a pair of leg portions being integral to and extending in parallel direction away from one of said ends of said base portion such that said bracket means is generally U-shaped, a bore extending through a central portion of said base portion, wherein a fastener may extend through said bore into the bumper of the vehicle, each of said leg portions having a pair of holes therein, said holes being positioned such that each of said holes are alignable with one of said slots in said side walls, each of a plurality of fastening means for removably fastening said legs to said side walls extending through one of said holes and a respective slot.

2. The adjustable supplemental headlight device as in claim 1, wherein said housing further comprises:
    a central wall being integral to and extending between said top and bottom walls, said central wall lying in a plane orientated generally perpendicular to planes of said side walls, said central wall being generally equally spaced from each of said side walls such that two compartments are defined.

3. The adjustable supplemental headlight device as in claim 2, wherein said housing further comprises:
    a front wall being integrally coupled to a front edge of said top, bottom and side walls, said front wall having two windows therein, each of said windows being positioned to correspond with an opening formed in said compartments, wherein said windows each define a peripheral edge of a lip extending perpendicularly away from said top, bottom and side walls, wherein a headlight may be placed in one of said compartments from a back side of said housing and abutted against said lip.

4. The adjustable supplemental headlight device as in claim 3, wherein said housing further comprises:
    a plurality of inner walls integral to and extending between said top and bottom walls, said inner walls lying in planes orientated substantially parallel to said central wall, wherein a plurality of compartments are defined, wherein said front wall has a window therein for each compartment.

5. The adjustable supplemental headlight device as in claim 2, further comprising:
    a securing means for securing the headlight in the opening, said securing means comprising an elongate member, a central portion of said elongate member being removably attached to a back side of said central wall, said elongate member having a longitudinal axis orientated generally perpendicular to said plane of said central wall such that said elongate member generally transverses a back side of said compartments, a pair of screws removably fastening said elongate member to said central wall.

6. The adjustable supplemental headlight device as in claim 2, wherein said bracket means further comprises:
    said base portion having a pair of channels therethrough, each of said channels being positioned generally adjacent to one of said ends of said base portion, each of said channels being elongate and being generally co-axial with a longitudinal axis of said base portion, wherein fasteners may extend through said channels and into the bumper of the vehicle.

7. The adjustable supplemental headlight device as in claim 1, further comprising:
    a shielding means for protecting headlights mounted in the housing, said shielding means comprising a generally translucent covering, said shielding means being removably coupled to said front wall, said translucent covering comprising a plastic material.

8. The adjustable supplemental headlight device as in claim 3, further comprising:
   a securing means for securing the headlight in the opening, said securing means comprising an elongate member, a central portion of said elongate member being removably attached to a back side of said central wall, said elongate member having a longitudinal axis orientated generally perpendicular to said plane of said central wall such that said elongate member generally transverses a back side of said compartments, a pair of screws removably fastening said elongate member to said central wall.

9. An adjustable supplemental headlight device, said device being removably coupled to a front bumper of a vehicle, said device being adapted for removably holding headlights and fog lights, said device comprising:
   a housing, said housing having a top wall, a bottom wall, and a pair of side walls, a central wall being integral to and extending between said top and bottom walls, said central wall lying in a plane orientated generally perpendicular to planes of said side walls, said central wall being generally equally spaced from each of said side walls such that two compartments are defined, each of said side walls having a pair of arcuate slots therein, each pair arcuate slots being spaced and lying along an edge of a common circle, a front wall being integrally coupled to a front edge of said top, bottom and side walls, said front wall having two windows therein, each of said windows being positioned to correspond with an opening formed in said compartments, wherein said windows each define a peripheral edge of a lip extending perpendicularly away from said top, bottom and side walls, wherein a headlight may be placed in one of said compartments from a back side of said housing and abutted against said lip;
   a securing means for securing the headlight in the opening, said securing means comprising an elongate member, a central portion of said elongate member being removably attached to a back side of said central wall, said elongate member having a longitudinal axis orientated generally perpendicular to said plane of said central wall such that said elongate member generally transverses a back side of said compartments, a pair of screws removably fastening said elongate member to said central wall;
   a bracket means for pivotally securing said housing to the bumper, said bracket means comprising a base portion, said base portion being elongate and having a first end and a second end, a pair of leg portions being integral to and extending in parallel direction away from one of said ends of said base portion such that said bracket means is generally U-shaped, said base portion having a pair of channels therethrough, each of said channels being positioned generally adjacent to one of said ends of said base portion, each of said channels being elongate and being generally co-axial with a longitudinal axis of said base portion, a bore extending through a central portion of said base portion, wherein fasteners may extend through said bore and said channels and into the bumper of the vehicle, each of said leg portions having a pair of holes therein, said holes being positioned such that each of said holes are alignable with one of said slots in said side walls, each of a plurality of fastening means for removably fastening said legs to said side walls extending through one of said holes and a respective slot, wherein said housing may be pivoted with respect to said bracket means by slidably moving said fastening means in said slot, each of said fastening means comprising a screw; and
   a shielding means for protecting headlights mounted in the housing, said shielding means comprising a generally translucent covering, said shielding means being removably coupled to said front wall, said translucent covering comprising a plastic material.

* * * * *